(12) United States Patent
Winer

(10) Patent No.: US 12,431,303 B2
(45) Date of Patent: Sep. 30, 2025

(54) VIBRATION-TOLERANT MULTI-POSITION, MULTI-POLE CONTINUOUS-ROTATION STEPPER RELAY

(71) Applicant: Hamilton Sundstrand Corporation, Charlotte, NC (US)

(72) Inventor: Gordon E. Winer, Prescott, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 374 days.

(21) Appl. No.: 18/169,173

(22) Filed: Feb. 14, 2023

(65) Prior Publication Data

US 2024/0274376 A1    Aug. 15, 2024

(51) Int. Cl.
*H01H 3/34* (2006.01)
*B64C 27/04* (2006.01)
(Continued)

(52) U.S. Cl.
CPC ............... *H01H 3/34* (2013.01); *H01H 9/20* (2013.01); *B64C 27/04* (2013.01); *B64D 15/12* (2013.01)

(58) Field of Classification Search
CPC ........ B64D 15/12; B64C 27/04; H01H 45/00; H01H 45/02; H01H 45/12; H01H 45/14; H01H 50/00; H01H 50/54; H01H 63/00; H01H 63/02; H01H 63/34; H01H 67/00; H01H 67/02; H01H 71/00; H01H 71/10; H01H 71/56; H01H 2003/22; H01H 2003/32; H01H 2043/00; H01H 2043/10; H01H 2043/106; H01H 3/02; H01H 3/32; H01H 3/34; H01H 3/42; H01H 3/54; H01H 3/60; H01H 9/20; H01H 13/70; H01H 19/62; H01H 19/64; H01H 43/00; H01H 43/10; H01H 43/101; H01H 43/102;
(Continued)

(56) References Cited

U.S. PATENT DOCUMENTS 6,583,371 B1    6/2003   Sokalski et al.
7,604,202 B2   10/2009   Froman et al.
(Continued)

FOREIGN PATENT DOCUMENTS

CH           247549 A       3/1947

OTHER PUBLICATIONS

Extended European Search Report for European Patent Application # 24157541.4, Dated Jun. 21, 2024, 12 Pages.

*Primary Examiner* — Anthony R Jimenez
(74) *Attorney, Agent, or Firm* — Kinney & Lange, P.A.

(57) ABSTRACT

Apparatus and associated methods relate to sequentially opening and/or closing a plurality of switches. A rotational securing assembly sequentially secures and releases a plurality of indexing members evenly distributed along a circular path centered on an axis of rotation of the rotatable disk, thereby sequentially securing and releasing the rotatable disk to and from a sequence of rotational positions. A ratcheting assembly sequentially engages a plurality of advancing members of the rotatable disk, thereby sequentially rotating the rotatable disk to a next one of the sequence of rotatable positions. A cam coupled to the rotatable disk sequentially either opens or closes a plurality of switches attached to an annular frame and distributed along a second circular path centered on the axis of rotation. Operations of the rotational securing assembly are coordinated with those of the ratcheting assembly so as to advance rotation of the rotatable disk in a stepwise fashion.

20 Claims, 10 Drawing Sheets

(51) Int. Cl.
*B64D 15/12* (2006.01)
*H01H 9/20* (2006.01)

(58) Field of Classification Search
CPC .... H01H 43/103; H01H 43/12; H01H 43/125; H01H 1/12; H01H 1/16; H01H 1/2041; H01H 1/50; H01H 1/502
USPC ....................................................... 200/179
See application file for complete search history.

(56) References Cited

U.S. PATENT DOCUMENTS

| | | |
|---|---|---|
| 9,810,486 B2 | 11/2017 | Tylutko |
| 11,015,882 B2 | 5/2021 | Goel et al. |
| 11,085,713 B2 | 8/2021 | Phillips et al. |
| 2020/0395182 A1 | 12/2020 | Buzzard et al. |

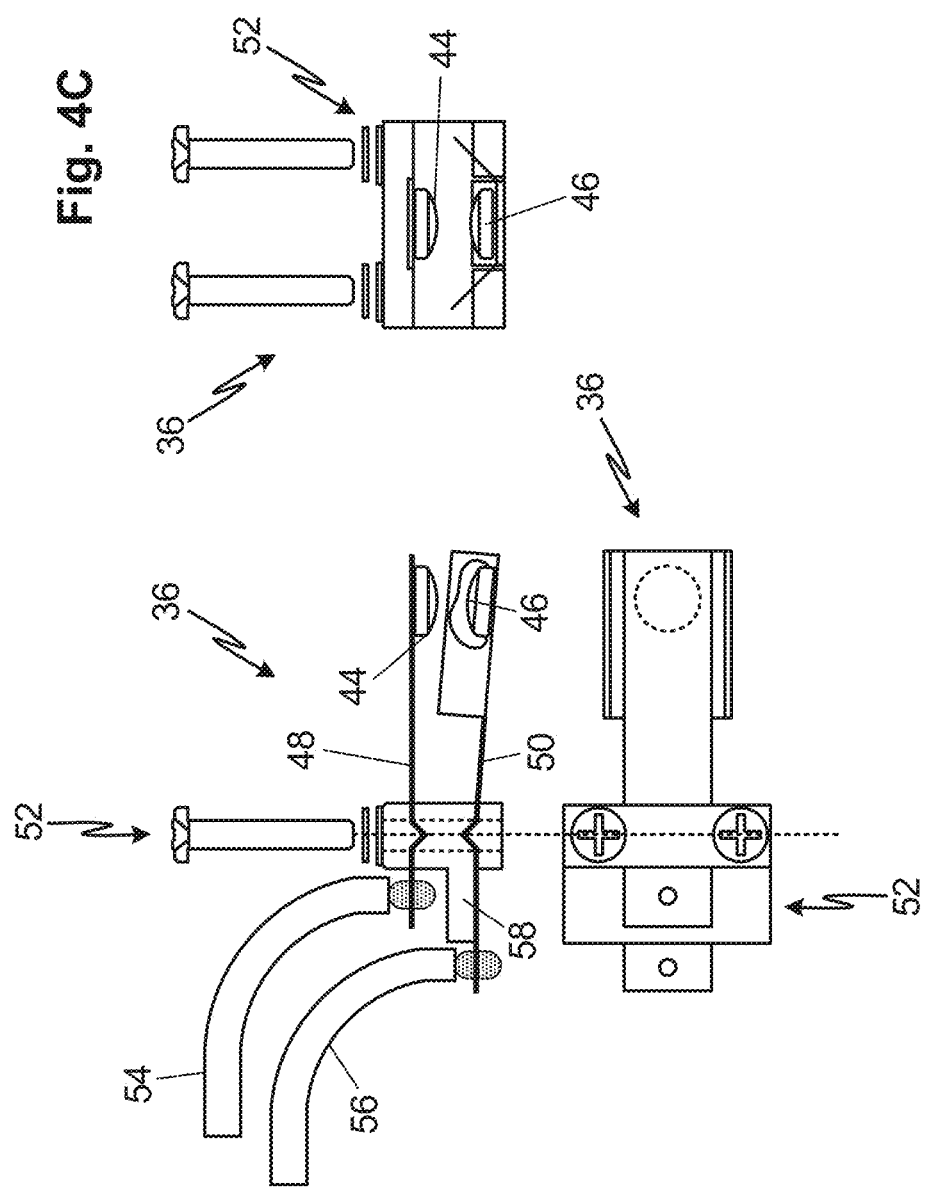

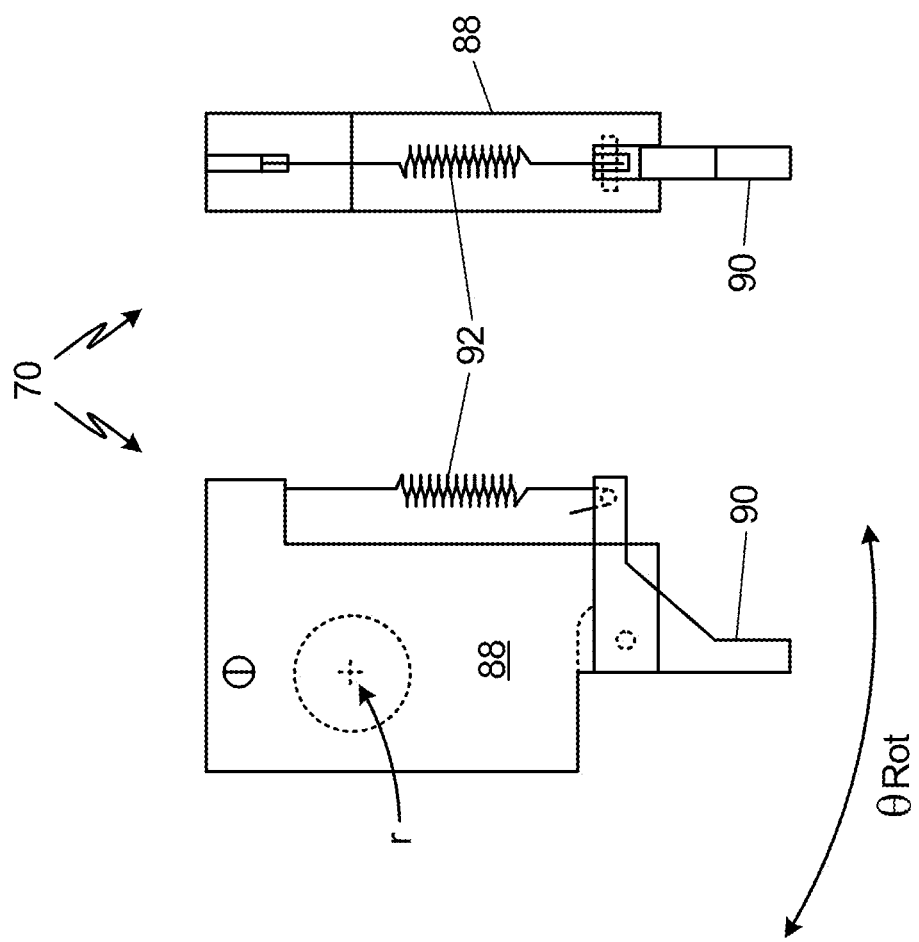

VIBRATION-TOLERANT MULTI-POSITION, MULTI-POLE CONTINUOUS-ROTATION STEPPER RELAY

BACKGROUND

Stepper relays are used to perform various operations for a wide variety of applications. Some stepper relays are used in environments that expose their operation to heavy vibrations. For example, stepper relays have been designed for helicopter rotor-blade de-icing systems. Such rotor-blade deicing systems sequentially activate heating elements at various locations on the rotor blades. Such rotor-blade de-icing systems are exposed to very harsh environmental conditions, requiring wide temperature operation as well as exposure to heavy vibration that results from the operation of the rotor blades. Although operating in a harsh environment, these rotor-blade de-icing systems must be reliable so as to ensure safe operation of the helicopter, especially in icing conditions.

SUMMARY

Some embodiments relate to a method for sequentially opening or closing a plurality of switches. The method generally includes the steps of: i) releasing a rotatable disk; ii) rotating the rotatable disk a fraction of a rotation; iii) securing the rotatable disk in the advanced rotation; and then iv) repeating steps i) through iii). These general steps are performed more specifically as follows. A rotation-restricted one of a circular sequence of indexing members attached to a rotatable disk along a circular path centered on an axis of rotation is secured, thereby preventing rotation of the rotatable disk from a secured one of a sequence of rotational positions. A ratcheting pawl is retracted, thereby positioning the ratcheting pawl in a ready-to-advance-rotation position. The rotation-restricted one of the circular sequence of indexing members attached to the rotatable disk is released so that the rotatable disk can be freely rotated. The ratcheting pawl is advanced so as to engage one of a circular sequence of advancing members, thereby rotating the rotatable disk to a next one of the sequence of rotatable positions. An aligned one of a circular sequence of normally-closed and/or normally-open switches is opened or closed, respectively. The circular sequence of normally-closed and/or normally-open switches are attached to an annular frame and distributed along a second circular path centered on the axis of rotation. The above steps are repeated, thereby sequentially opening and/or closing the circular sequence of normally-closed and/or normally open switches.

Some embodiments relate to a system for sequentially opening and/or closing a plurality of switches. The system includes a rotatable disk having a plurality of indexing members attached thereto. The plurality of indexing members are evenly distributed along a circular path centered on an axis of rotation of the rotatable disk. The system includes a rotational securing assembly configured to sequentially secure and release the plurality of indexing members attached to a rotatable disk, thereby sequentially securing and releasing the rotatable disk to and from a sequence of rotational positions. The system includes a ratcheting assembly configured to sequentially engage a plurality of advancing members of the rotatable disk, thereby sequentially rotating the rotatable disk to a next one of the sequence of rotatable positions. The system includes a plurality of switches attached to an annular frame and distributed along a second circular path centered on the axis of rotation and axially aligned with a cam coupled to the rotatable disk. Each of the plurality of switches have a spring-loaded contact configured to either open or close the switch in response to a cam being rotatably aligned with the spring-loaded contact. The system includes a control system configured to coordinate operations of the rotational securing assembly with the ratcheting assembly so as to advance rotation of the rotatable disk in a stepwise fashion to a next one in the sequence of rotational positions. The control system causes: i) the rotational securing assembly releases a previously secured one of the plurality of indexing members of the rotatable disk; then ii) the ratcheting assembly engages a next one of the plurality of advancing members of the rotatable disk; then iii) the rotational securing member secures a next secured one of the plurality of indexing members; and iv) the steps i) through iii) are repeated, thereby sequentially opening or closing the plurality of normally-closed and/or normally open switches.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 4A-4C are a plan view, a side-elevation view, and an end-elevation view of switches used in a multi-pole continuous-rotation stepper relay.

FIGS. 7A and 7B are a side-elevation view and an end-elevation view of the ratcheting pawl depicted in FIGS. 5A and 5B.

DETAILED DESCRIPTION

Apparatus and associated methods relate to sequentially opening and/or closing a plurality of switches. A rotational securing assembly sequentially secures and releases a plurality of indexing members evenly distributed along a circular path centered on an axis of rotation of the rotatable disk, thereby sequentially securing and releasing the rotatable disk to and from a sequence of rotational positions. A ratcheting assembly sequentially engages a plurality of advancing members of the rotatable disk, thereby sequentially rotating the rotatable disk to a next one of the sequence of rotatable positions. A cam coupled to the rotatable disk sequentially either opens or closes a plurality of switches attached to an annular frame and distributed along a second circular path centered on the axis of rotation. Operations of the rotational securing assembly are coordinated with those of the ratcheting assembly so as to advance rotation of the rotatable disk in a stepwise fashion.

Figure 1:
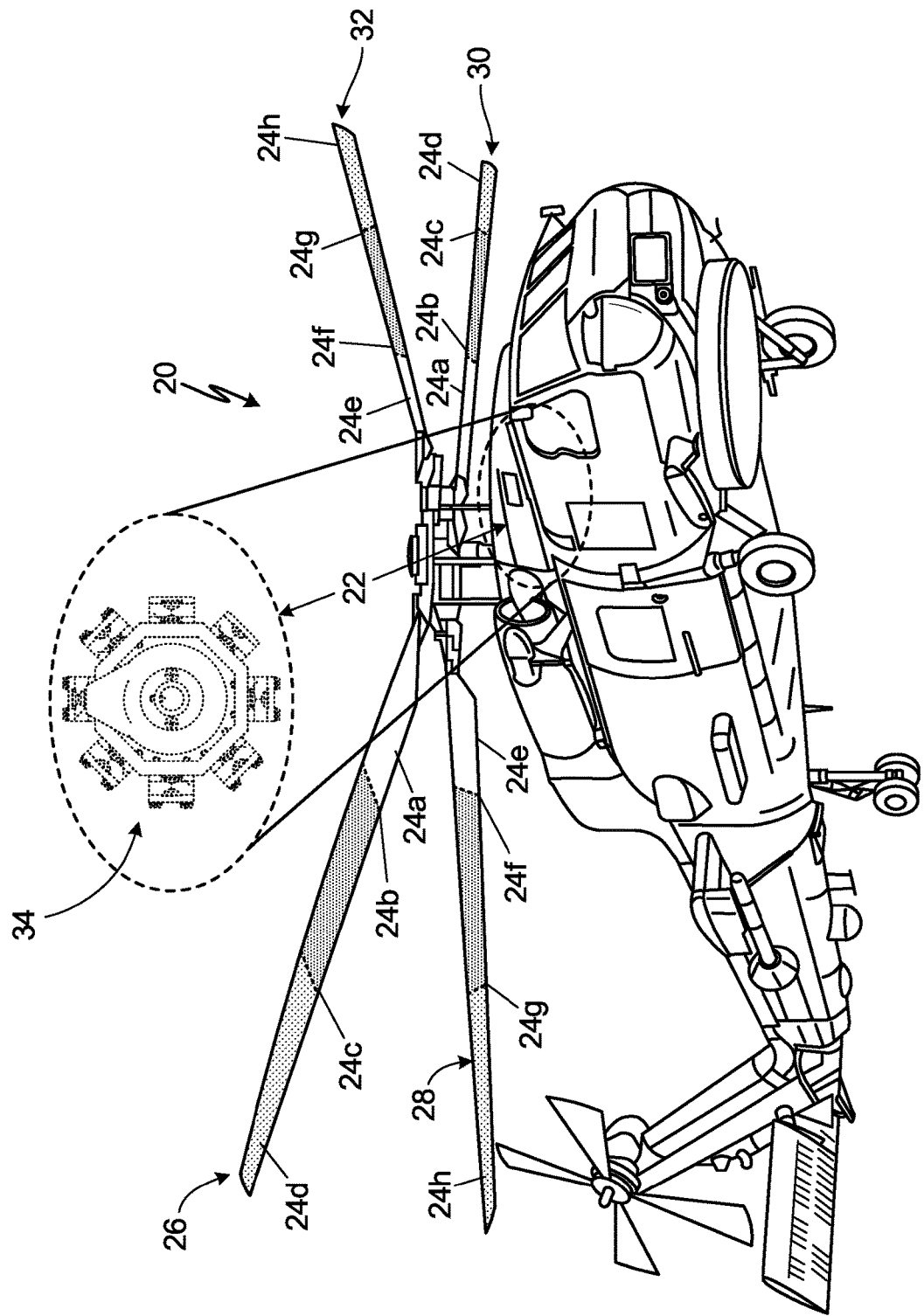
FIG. 1 is a perspective view of a helicopter equipped with a deicing system controlled using a multi-pole continuous-rotation stepper relay.

FIG. 1 is a perspective view of a helicopter equipped with a deicing system controlled using a multi-pole continuous-rotation stepper relay. In FIG. 1, helicopter 20 is equipped with deicing system 22. Deicing system 22 includes heating elements 24a-24h, which are located at various spanwise zones of the rotor blades 26, 28, 30 and 32. Heating elements 24a-24h are energized in a sequence. For example, heating elements 24a, which are located at the innermost spanwise zone (i.e., near the rotor hub) of diametrically opposed rotor blades 26 and 30 are energized first. Ice that has accreted upon such locations will be melted and the resulting liquid water will either be shed from the blades or will flow to another spanwise zone. Diametrically opposed pairs of rotor blades are heated at the same time so as to preserve balance, thereby lessening vibration. After the heating elements 24a are deenergized, then heating elements 24b, which are located adjacent to the innermost spanwise zone of rotor blades 26 and 30 are energized. Ice that has accreted upon these zones of blades 26 and 30 will be melted and the resulting liquid water will either be shed from the blades or will flow to another spanwise zone. After the heating elements 24b are deenergized, then heating elements 24c, which are the next zones (proceeding from the hub to the tip) of rotor blades 26 and 30 are energized. Ice that has accreted upon these zones of blades 26 and 30 will be melted and the resulting liquid water will either be shed from the blades or will flow to the outermost spanwise zone (i.e., the zone near the tip of rotor blades 26 and 30). After the heating elements 24c are deenergized, then heating elements 24d, which are the outermost zones (i.e., located at the ends of rotor blades 26 and 30) of rotor blades 26 and 30 are energized. Ice that has accreted upon these zones of blades 26 and 30 will be melted and the resulting liquid water will be shed from rotor blades 26 and 30. Such deicing of oppositely located blades ensures that balance of blades 26 and 30 is maintained throughout the deicing process.

After the above process of deicing blades 26 and 30 has been performed, the process is then performed on blades 28 and 32, beginning with innermost heating elements 24c and ending with outermost heating elements 24h. This sequencing of heating elements 24a-24h has shown to provide good deicing capability while consuming relatively low power. Although the heating elements 24a-24h are depicted as located at various spanwise zones, some embodiments use chordwise zones for deicing rotor blades 26, 28, 30 and 32. In still other embodiments, the zones have both chordwise and spanwise components. Such configurations of zones are designed to best accommodate the flow direction of the liquid water along rotor blades 26, 28, 30 and 32. Such zoned operation of deicing system 22 is performed so that ice that has been liquified in one zone travels to another zone that will then blade-zone which is controlled using continuous-rotation stepper relay 34, which is shown in more detail in FIG. 2.

To actuate heating elements in sequence, deicing system 22 includes continuous-rotation stepper relay 34. Continuous-rotation stepper relay 34 has eight poles 36a-36h or switches that actuate the eight-step sequence described above: i) activating heating element 24a of rotor blades 26 and 30; ii) activating heating element 24b of rotor blades 26 and 30; iii) activating heating element 24c of rotor blades 26 and 30; iv) activating heating element 24d of rotor blades 26 and 30; v) activating heating element 24e of rotor blades 28 and 32; vi) activating heating element 24f of rotor blades 28 and 32; vii) activating heating element 24g of rotor blades 28 and 32; viii) activating heating element 24h of rotor blades 28 and 32. This sequence can then be repeated, for example, continuously, for a period of time, or for a predetermined number of sequences, etc. The eight switches 36a-36h of continuous-rotation stepper relay 34 are evenly distributed along a circular path about rotatable cam 38 that sequentially actuates the eight switches 36a-36h. Rotatable cam 38 is rigidly secured by a rotational securing assembly when actuating one of the eight switches, as will be described below. Such rigid securing of rotatable cam 38 renders operation of switches 36a-38h tolerant of vibration.

Although an eight-step sequence has been described to sequentially activate the eight sets of heating elements 24a-24h, as depicted in FIG. 1, other numbers of heating zones can be utilized using corresponding numbers of heating elements and sequencing steps. Furthermore, although only one switch was described as activating each of heating elements 24a-24h, multiple switches can be activated in each step. For example, to provide three-phase power to each zone, three poles or switches can be activated at each step of the sequence. In another example, each step of the sequence can perform more than one function, and thus use more than one switch or pole.

Figure 2:
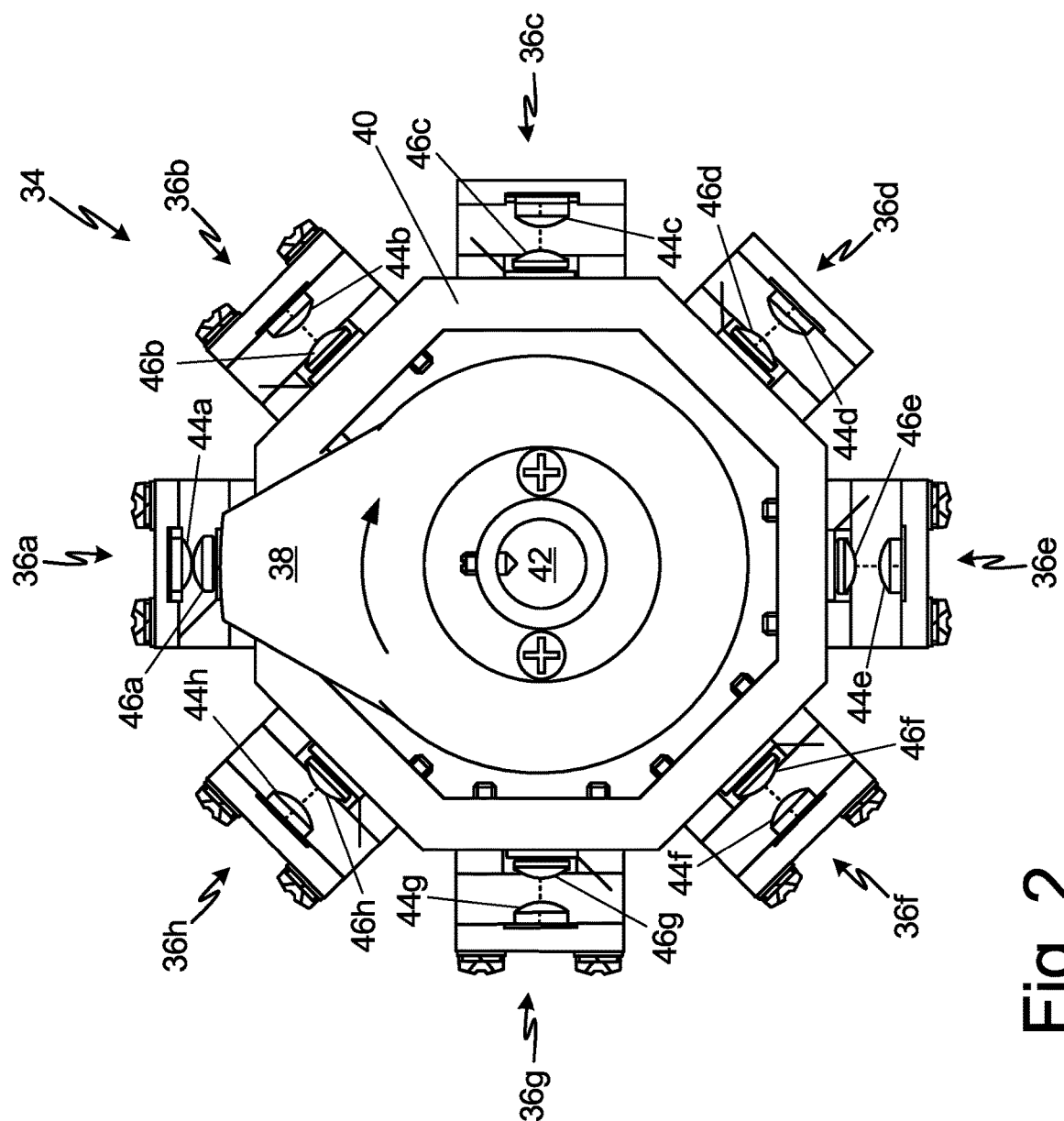
FIG. 2 is a side-elevation view of a multi-pole continuous-rotation stepper relay.

FIG. 2 is a side-elevation view of a multi-pole continuous-rotation stepper relay. In FIG. 2, continuous-rotation stepper relay 34 includes normally-opened switches 36a-36h mounted on annular frame 40 that circumscribes rotatable shaft 42, to which is attached rotatable cam 38. Rotatable shaft 42 rotates, relative to annular frame 40 so as to sequentially align rotatable cam 38 with switches 36a-36h. Instead of rotating at a constant rotational speed, rotatable shaft 42 rotates in a stepwise fashion, advancing rotatable cam 38 quickly when between switches 36a-36h, and then leaving rotatable cam 38 to dwell at each of switches 36a-36h for a predetermined period of time. Such stepwise rotational operation will be described below with respect to FIG. 8. In the FIG. 2 depiction, switches 36a-36h are configured as normally-open. Each of switches 36a-36h has outer contact 44a-44h connected to annular frame 40. Each of switches 36a-36h has a corresponding inner contact 46a-46h that is spring loaded so that when rotatable cam 38 is aligned with inner contact 46a-46h, inner contact 46a-46h moves outwardly so as to conductively engage corresponding outer contact 44a-44h, thereby closing switch 36a-36h.

Figure 3:
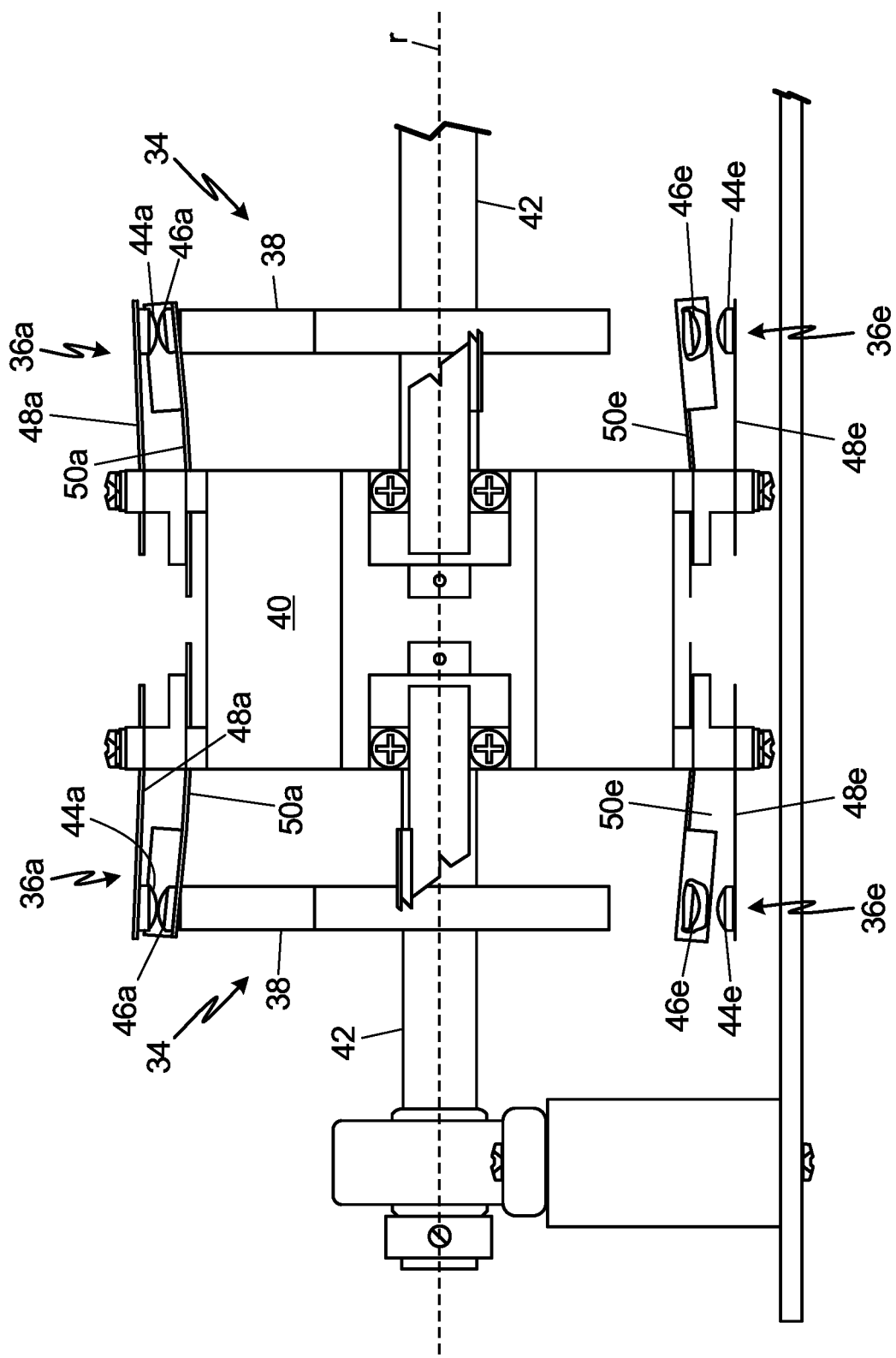
FIG. 3 is a cross-sectional view of a dual multi-pole continuous-rotation stepper relay.

FIG. 3 is a cross-sectional view of a dual multi-pole continuous-rotation stepper relay. FIG. 3 depicts two multi-pole continuous-rotation stepper relays 34 as depicted in FIG. 2 cross-sectioned along rotational axis r and through contacts 44a and 46a of switch 36a, as well as through contacts 44e and 46e of switch 36e. Multi-pole continuous-rotation stepper relays 34 are operated by rotatable cams 38, which in turn are connected to rotatable shafts 42. In the depicted embodiment, rotatable shafts 42 are not connected to one another, thereby facilitating independent operation of each of multi-pole continuous-rotation stepper relays 34. In other embodiments, a single rotatable shaft can be used to rotate both rotatable cams 38, thereby providing coordinated operation of multi-pole continuous-rotation stepper relays 34. In the FIG. 3 embodiment, outer contacts 44*a* and 44*c* and inner contacts 46*a* and 46*c* are cantilevered from annular frame 40 by cantilevering arms 48*a*, 48*c*, and 50*a* and 50*e*, respectively. Cantilevering arm 50*a* of inner contact 46*a* is deflected upward by rotatable cam 38. Cantilevering arm 48*a* of upper contact 44*a* shows only modest upward deflection. A spring constant of lower cantilevering arms 50*a*-50*h* can be selected to permit such upward deflection, while being stiff enough so that vibration will not cause lower contacts 46*a*-46*h* to make connection with upper contacts 44*a*-44*h* when rotatable cam 38 is not aligned thereto. A spring constant of lower cantilevering arms 48*a*-48*h* can be selected to be stiff enough so that vibration will not cause upper contacts 44*a*-44*h* to lose connection with lower contacts 46*a*-46*h* when rotatable cam 38 is aligned thereto. In some embodiments the spring constant of upper cantilevering arms 48*a*-48*h* is greater than (e.g., 2 times, 3 times, 5 times, or 10 times greater than) a spring constant of lower cantilevering arms 50*a*-50*h*.

FIGS. 4A-4C are a plan-view, a side-elevation view, and an end-elevation view of a high-current contact switch used in a multi-pole continuous-rotation stepper relay. In FIGS. 4A-4C, high-current contact switch 36 includes upper contact 44 and lower contact 46. Upper contact 44 is cantilevered from mounting assembly 52 by upper cantilevered arm 48 and lower contact 46 is cantilevered from mounting assembly 52 by lower cantilevered arm 50. Current conductors 54 and 56 are conductively connected to upper 48 and lower 50 cantilevered arms, respectively. Insulative material 58 provides electrical insulation between current conductor 54 and lower cantilevered arm 50. The strength of the spring constant of upper cantilevered arm 48 is sufficient to prevent momentary openings of switch 46 when experiencing maximum expected vibration.

Figures 5A, 5B:
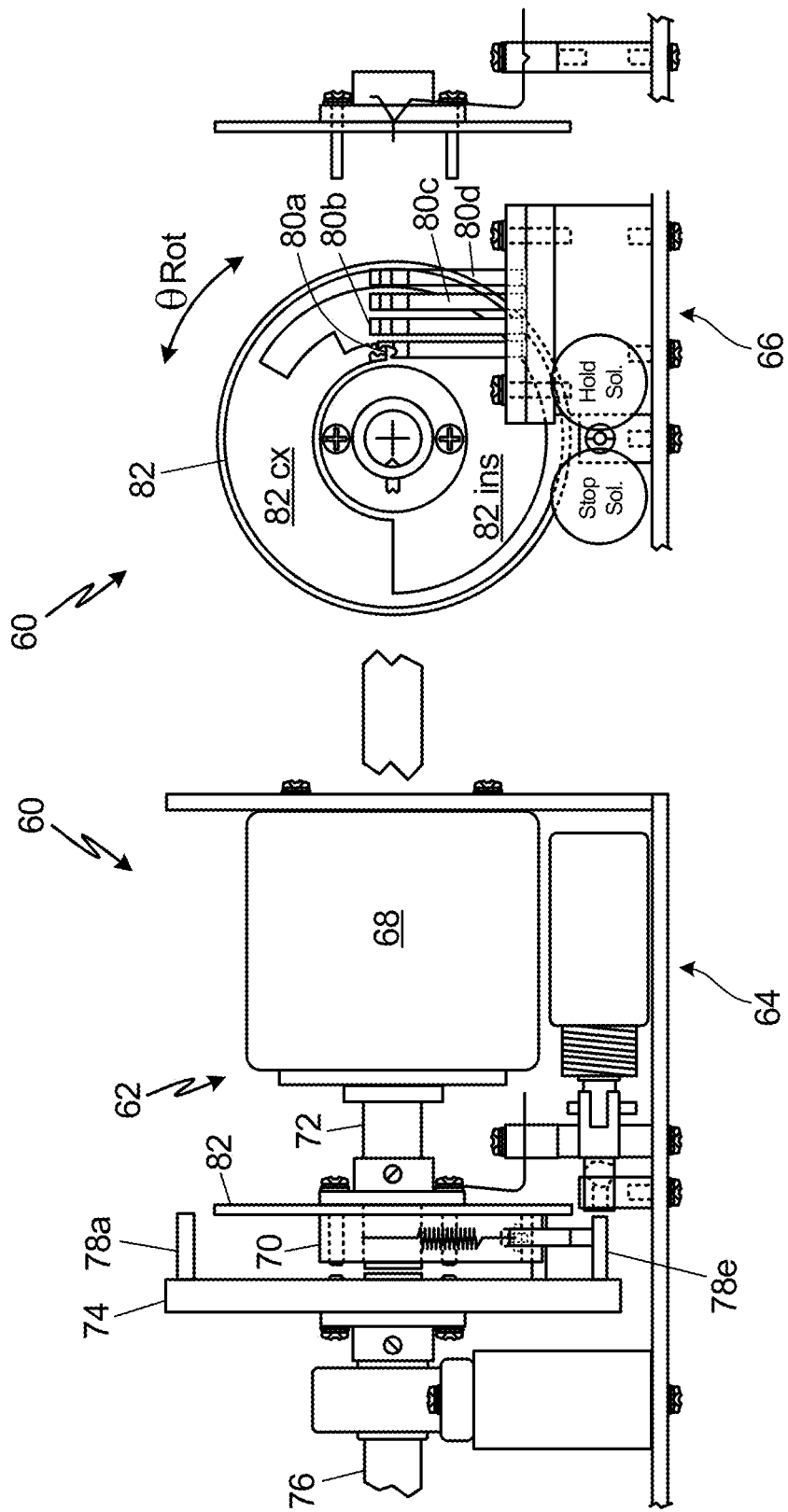
FIGS. 5A and 5B area side-elevation view and an end-elevation view of a rotation control subsystem for a multi-pole continuous-rotation stepper relay and an axial view of switch controls for the multi-pole continuous-rotation stepper relay.

FIGS. 5A and 5B are a side-elevation view and an end-elevation view of a rotation control subsystem for a multi-pole continuous-rotation stepper relay and an axial view of switch controls for the multi-pole continuous-rotation stepper relay. In FIGS. 5A and 5B, rotation control subsystem 60 includes ratcheting assembly 62, rotational securing assembly 64, and control system 66. Ratcheting assembly 62 includes rotary solenoid 68 coupled to ratcheting pawl 70 via first rotatable shaft 72. Ratcheting assembly 62 is configured to rotate rotatable disk 74, which is connected to rotatable cam 38 (depicted in FIGS. 1-3), via second rotatable shaft 76, which in the depicted embodiment is coaxial with first rotatable shaft 72. Rotary solenoid 68 rotates rotatable disk 74 by alternately rotating ratcheting pawl 70 (which will be shown below in more detail with reference to FIG. 7) back and forth over a predetermined angle of rotation PROT. Ratcheting pawl 70 then sequentially engages each of a plurality of indexing members 78*a*-78*h* evenly distributed along a circular path centered on an axis of rotation of rotatable disk 74. Only indexing members 78*a* and 78*c*, at the 12 o'clock and 6 o'clock positions are depicted in FIGS. 5A and 5B, so that the view of ratcheting pawl 70 is not obscured thereby. In the depicted embodiment, indexing members 78*a*-78*h* are cylindrical projections from rotatable disk 74. Various other geometries can be used for the same purpose as that of indexing members 78*a*-78*h*.

As ratcheting pawl 70 rotates in a first direction, ratcheting pawl is configured to engage an engagement ready one of indexing members 78*a*-78*h*, thereby rotating rotatable disk 74 thereby. As ratcheting pawl 70 rotates in a second direction, opposite the first direction, ratcheting pawl 70 disengages the previously engaged indexing member and bypasses (i.e., without engaging), a next engagement-ready one of indexing members 78*a*-78*h*. In this way, ratcheting pawl 70 rotates rotatable disk 74 in a ratcheted fashion, a fraction of a complete rotation at a time (i.e., the fraction equal to 1/n, where n is the number of indexing members 78*a*-78*h*). To ensure that the rotatable disk 74 is rotated by the fraction of a complete rotation each engagement, the predetermined angle that rotary solenoid 66 alternately rotates ratcheting pawl 70 is greater than the angular separation between adjacent indexing members (e.g., between 78*a* and 78*b*).

Control system 66 controls coordination of rotational securing assembly 64 with ratcheting assembly 62. Control system 66 includes switches 80*a*, 80*b*, and 80*c*, which control operation of rotational securing assembly 64, which will be described below in more detail below, with reference to FIG. 6. In a nutshell, rotational securing assembly permits free rotation of rotatable disk 74 at specific phases of rotation of ratcheting pawl 70 and secures a position of rotatable disk 74 at other phases of rotation of ratcheting pawl 70. Electrical switches are formed by brushes 80*a*-80*d* and Printed Circuit Board (PCB) 82. PCB 82 has exposed copper region 82*ex* and insulated region 82*ins*. PCB 82 is coupled to first rotatable shaft 72, thereby alternately rotating, back and forth, over the predetermined angle of rotation $\theta_{ROT}$ along with ratcheting pawl 70. As PCB 82 rotates, brushes 80*a*, 80*b*, and 80*c* break or make conductive contact with exposed copper region 82*ex*. Brush 80*d* is located at the outer radius of PCB 82 where brush 80*d* is in conductive contact with exposed copper region 82*ex* regardless of rotational phase of PCB 82. In the depicted embodiment exposed copper region 82*ex* circumscribes PCB 82 at the radius that brush 80*d* is located. In other embodiments, copper is exposed to brush 80*d* only over the predetermined angle of rotation $\theta_{ROT}$ by rotary solenoid 68.

Although the rotation control subsystem described above uses rotary solenoid 68 to alternately rotating ratcheting pawl 70 back and forth over the predetermined angle of rotation $\theta_{ROT}$, other types of reciprocating actuators can be used to perform such a function. For example, a linear solenoid can be configured to alternately move ratcheting pawl 70 back and forth between two predetermined positions, so as to rotate rotatable disk 74 in a ratcheted fashion, a fraction of a complete rotation at a time.

Figure 6B:
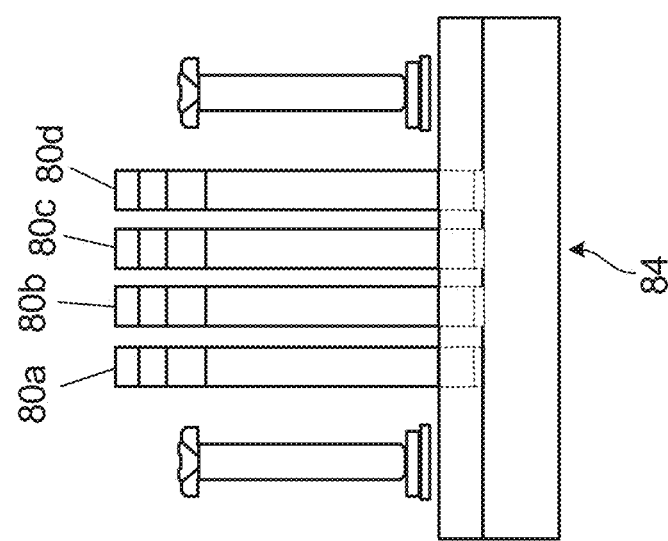
FIGS. 6A and 6B show side-elevation and end-elevation views of the brush assembly depicted in FIGS. 5A and 5B.
Figure 6A:
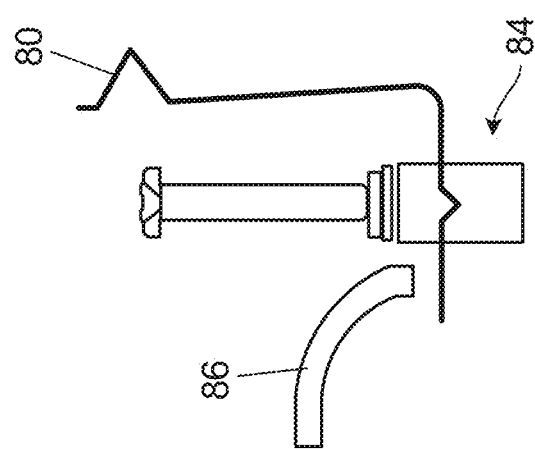

FIGS. 6A and 6B show side-elevation and end-elevation views of the brush assembly depicted in FIGS. 5A and 5B. In FIGS. 6A and 6B, brushes 80 (i.e., brushes 80*a*-80*d*) are shown from two vantage points. From each vantage point, brushes 80*a*-80*d* extend from brush mounting assembly 84. Each of brushes 80 conductively connect to a corresponding electrical wire 86, which carries the electrical signal indicative of the state of brush conduction with exposed copper region 82*ex* of PCB 82. Brush 80*d* is in constant conductive contact with exposed copper region 82*ex*, thereby biasing exposed copper region 82*ex*. Each of brushes 80*a*-80*c* will be biased by exposed copper region 82*ex* when conductively coupled thereto and will likely be biased by a biasing network otherwise (e.g., a resistive pull-up or pull-down network).

A first switch that formed with brush 80*a* generates a control signal that is used to cause rotational securing assembly 64 to permit free rotation of rotatable disk 74. A second switch formed with brush 80*b* generates a control signal that is used to cause rotational securing assembly 64 to block forward rotation of rotatable disk 74. A third switch formed with brush 80*c* generates a control signal that is used to cause rotational securing assembly 64 to block reverse rotation of rotatable disk 74, thereby securing rotatable disk 74 in a fixed position. If, instead of a rotary solenoid, a linear solenoid is used as the reciprocating actuator, then PCB 82 would have exposed copper region 82ex and insulated copper region 82ins that would have linear geometries rather that semi-circular geometries.

FIGS. 7A and 7B are a side-elevation view and an end-elevation view of the ratcheting pawl depicted in FIGS. 5A and 5B. In FIGS. 7A and 7B, ratcheting pawl 70 includes shaft-connecting body 88, pivotable engagement member 90 and return spring 92. Rotary solenoid 68 (depicted in FIG. 5) alternately rotates shaft-connecting body 88 of ratcheting pawl 70 back and forth over a predetermined angle of rotation $\theta_{ROT}$ about rotation axis r. Pivotable engagement member 90 is pivotably connected to shaft-connecting body 88. As ratcheting pawl 70 moves in a first direction, pivotable engagement member 90 engages, without pivoting, an engagement-ready one of indexing members 78a-78h (depicted below in FIG. 8), After such engagement, both pivotable engagement member 90 and the engagement-ready one of indexing members 78a-78h move, thereby rotating rotatable disk 74. Rotatable disk 74 rotates until stopped by rotation securing assembly 64. Rotation securing assembly is configured to stop rotation of rotatable disk 74 after being rotated a fraction of a rotation, the fraction defined by an inverse of the number of indexing members 78a-78h. As ratcheting pawl 70 moves in a second direction opposite the first direction, pivotable engagement member 90 disengages the engagement-ready one of indexing members 78a-78h (depicted below in FIG. 8), After such disengagement passes by a next engagement-ready one of indexing members 78a-78h, by pivoting in response to contact with the next engagement-ready one of indexing members 78a-78h. Ratcheting pawl 70 comes to rest in a ready position when rotary solenoid 68 completes its back-and-forth rotation cycle. The rotatable disk rotates one fraction of a rotation in response to each back-and-forth rotation cycle of rotary solenoid 68.

Figure 8:
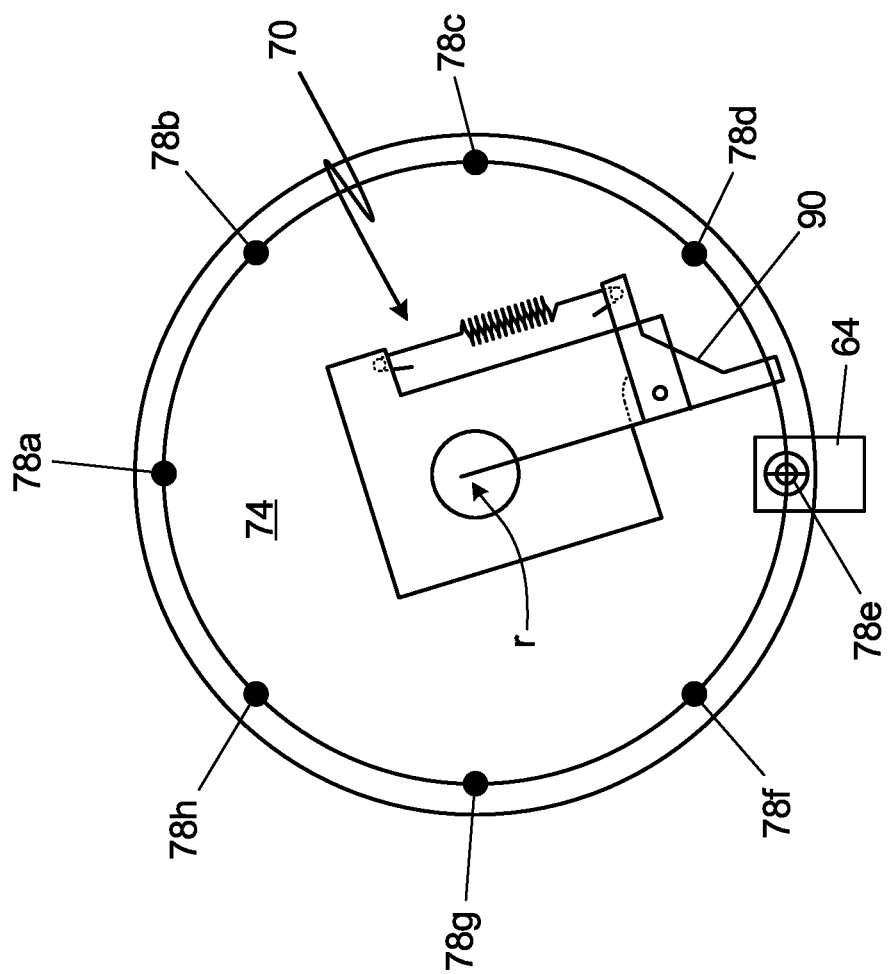
FIG. 8 is an end-elevation view of the rotatable disk depicted in FIG. 5 as it is being rotated in a ratchet fashion by the ratcheting pawl depicted in FIGS. 5A and 5B.

FIG. 8 is an end-elevation view of the rotatable disk depicted in FIGS. 5A and 5B as it is being rotated in a ratchet fashion by the ratcheting pawl depicted in FIGS. 5A and 5B. In FIG. 8 rotatable disk 74 includes indexing members 78a-78h attached thereto along a circular path centered on an axis of rotation r, In the depicted embodiment such an axis of rotation is shared by both ratcheting pawl 70 and rotatable disk 74. First and second rotatable shafts 72 and 76, to which ratcheting pawl 70 and rotatable disk 74 are connected, respectively, are axially aligned with one another. First rotatable shaft alternately rotates, back and forth, thereby rotating ratcheting pawl 70 in a back-and-forth manner. Each back-and-forth rotation cycle of ratcheting pawl 70 engages and rotates an engagement-ready one of indexing members 78a-78h by a fraction 360°/n of a full rotation, where n is the number of indexing members. In this way, ratcheting pawl 70 sequentially engages each of indexing members 78a-78h so as to rotate rotatable disk 74 in a ratcheted manner. Rotation securing assembly 64 releases a secured one of indexing members 78a-78h immediately before ratcheting pawl 70 engages the engagement ready one of indexing members 78a-78h so that rotatable disk 74 can be rotated upon such engagement. Rotation securing assembly then block forward rotation of one of indexing members 78a-78h so that rotatable disk only rotates the fraction 360°/n of a full rotation each back-and-forth rotation cycle of ratcheting pawl 70. When ratcheting pawl 70 completes such a fraction of rotation, rotation securing assembly 64 blocks reverse rotation of the blocked one of indexing members 78a-78h, thereby securing rotatable disk 74 at the last rotated position. Such securing permits pivotable engagement member 90 to pivot over and past a next engagement-ready one of indexing members 78a-78h when moving in a second direction opposite the first direction.

Figure 9A:
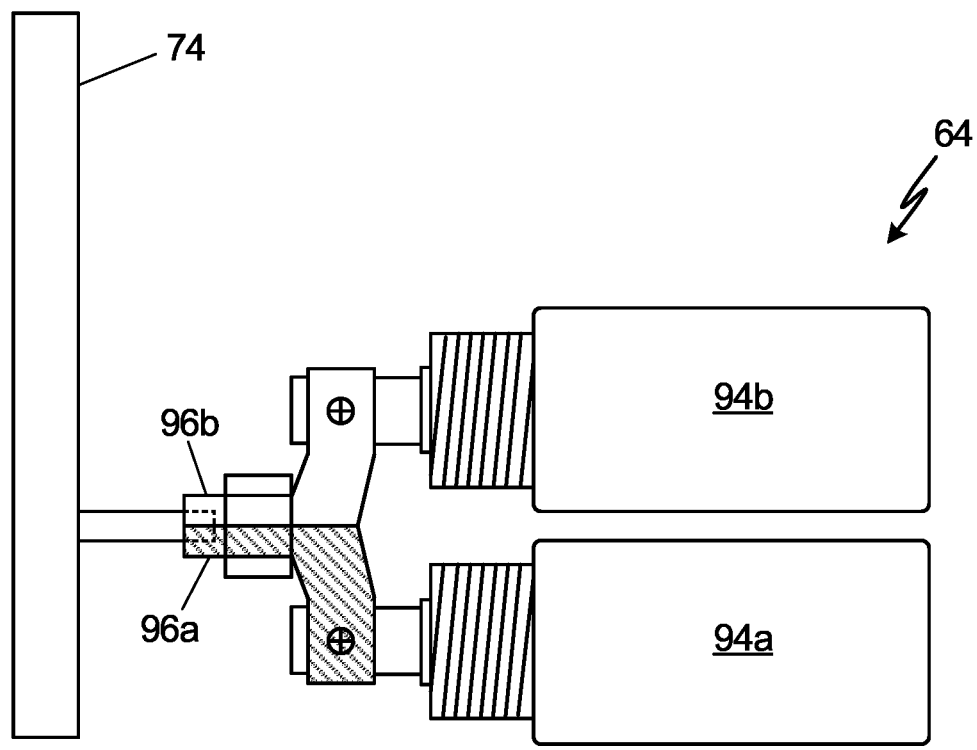
FIGS. 9A and 9B are plan views of the rotational securing assembly depicted in FIGS. 5A and 5B.
Figure 9B:
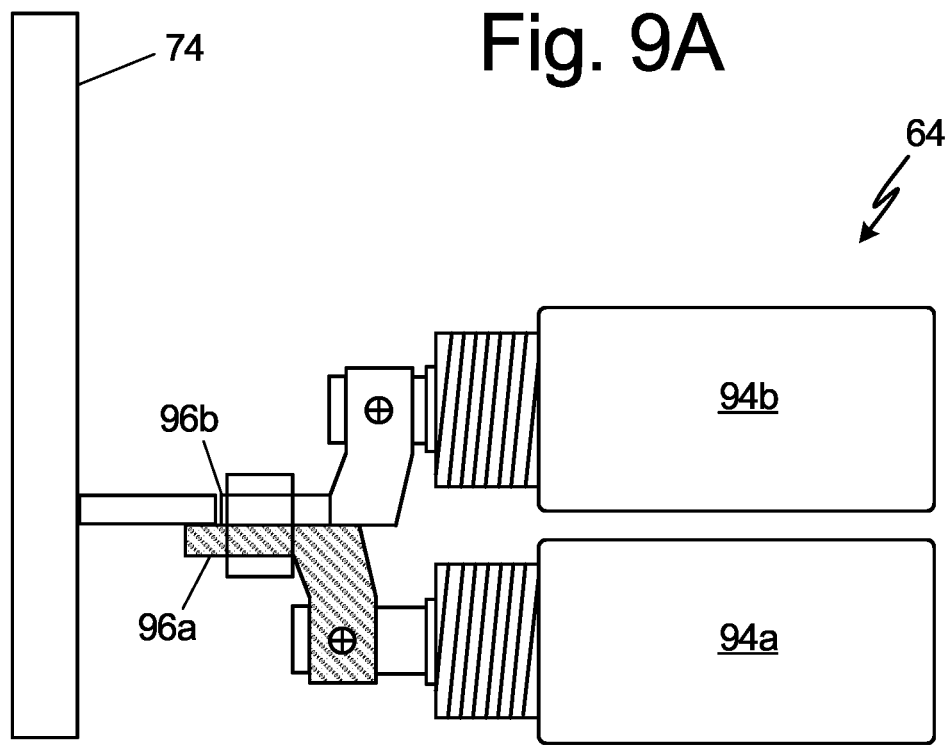

FIGS. 9A and 9B are plan views of the rotational securing assembly depicted in FIGS. 5A and 5B. In FIGS. 9A and 9B, rotation securing assembly 64 includes first solenoid 94a and second solenoid 94b, which linearly project index-stop member 96a and index-hold member 96b toward or away from rotatable disk 74 (depicted in FIG. 8). When projected toward rotatable disk 74, index-stop member 96a blocks forward movement of one of indexing members 78a-78h at a securing location. FIG. 9B depicts such a configuration, with index-stop member 96a projected thereby blocking forward movement of a blocked one of indexing members 78a-78h, which is coupled to rotatable disk 74. After indexing member 78 is blocked by projected index-stop member 96a, then index-hold member 96b will be projected toward rotatable disk 74, thereby blocking reverse movement of the one of indexing members 78a-78h at the securing location (i.e., the one blocked by index-stop member 96a). FIG. 9A depicts such a configuration, with index-stop member 96a and index-hold member projected thereby blocking both forward and reverse movements of a secured one of indexing members 78a-78h, which is coupled to rotatable disk 74. Index-stop member 96a and index-hold member 96b can be cylindrically cupped so as to surround the secured one of indexing members 78a-78h, when both are projected toward rotatable disk 74. Thus, index-stop member 96a and index-hold member 96b cradle the secured one of indexing members 78a-78h.

Although indexing members 78a-78h are used both by the rotational securing assembly 64 (to controllably secure rotatable disk 74) and by ratcheting assembly 62 (to rotate rotatable disk 74), different members can be used for these two different operations. For example, advancing members, different from the indexing members, can be use by ratcheting assembly 62 to rotate rotatable disk 74. Furthermore, the same or different indexing members can be used in each back-and-forth phase of operation, by each of ratcheting assembly 62 and rotational securing assembly 64.

Figure 10:
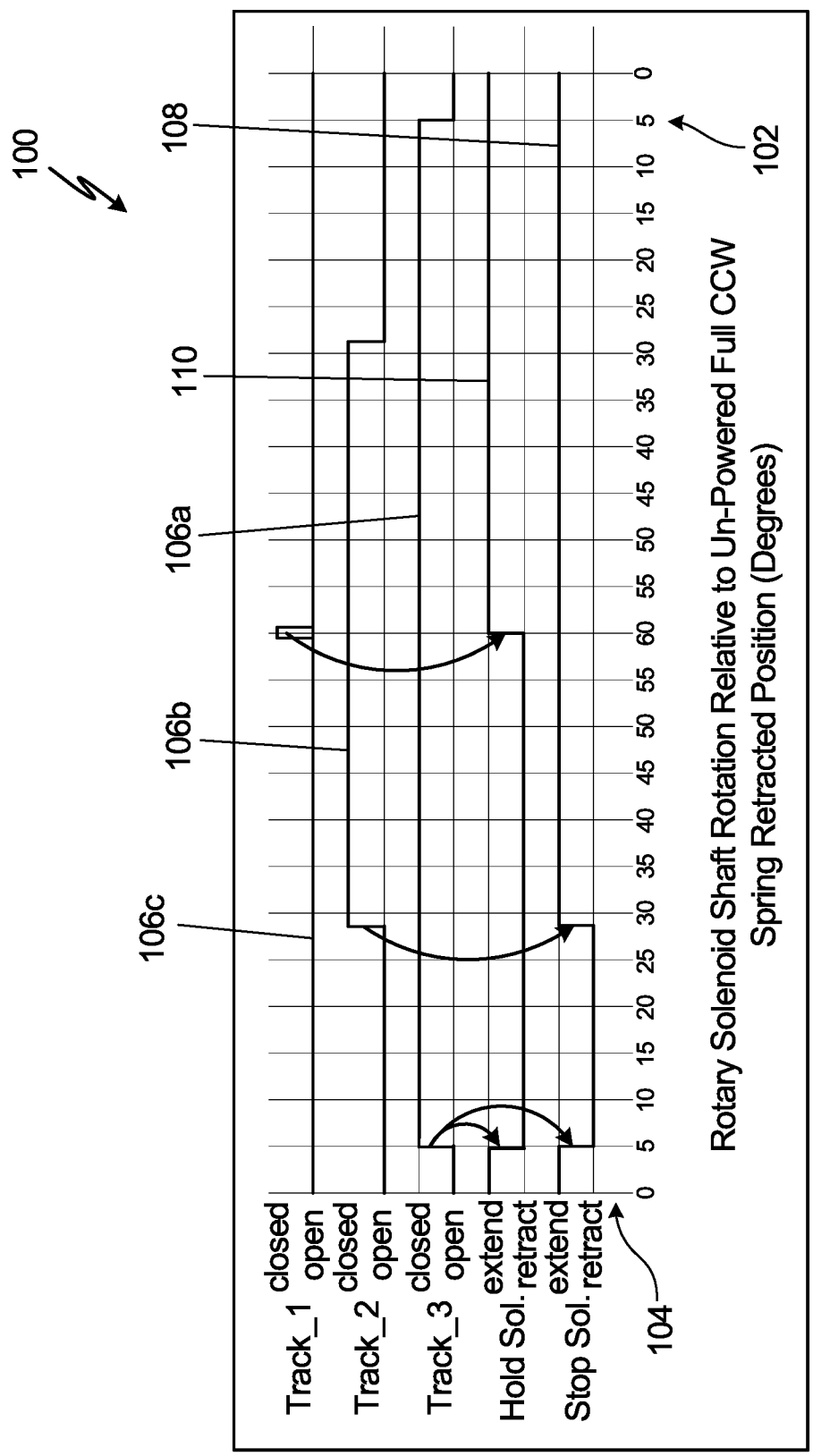
FIG. 10 is a graph of control signals that coordinate operation of the rotational securing assembly with the ratcheting assembly.

FIG. 10 is a graph of control signals that coordinate operation of the rotational securing assembly with the ratcheting assembly. In FIG. 10, Graph 100 includes horizontal axis 102, vertical axis 104, switch signals 106a-106c and control signals 108 and 110. Horizontal axis 102 is indicative of rotational angle of rotary solenoid 68 as it rotates back and forth over time, and vertical axis 104 is indicative of signal level. Switch signal 106a is generated by brush 80a, which indicates a first rotational angle of ratcheting pawl 70 at which both index-stop member 96a and index-hold member 96b are retracted, thereby permitting free rotation of rotatable disk 74. Switch signal 106b is generated by brush 80b, which indicates a second rotational angle of ratcheting pawl 70 at which index-stop member 96a is projected toward rotatable disk 74, thereby blocking forward movement of one of indexing members 78a-78h. Switch signal 106c is generated by brush 80c, which indicates a third rotational angle of ratcheting pawl 70 at which index-hold member 96b is projected toward rotatable disk 74, thereby blocking reverse movement of the blocked one of indexing members 78a-78h.

Control signals 108 and 110 are generated based on switch signals 106a-106c. Stop control signal 108 controls operation of first solenoid 94a, which projects and retracts index-stop member 96a. Hold control signal 110 controls operation of second solenoid 94b, which projects and retracts index-stop member 96b. In this way, operations of index-stop member 96a and index hold member 96b are coordinated with rotational position of ratcheting pawl 70.

Discussion of Possible Embodiments

The following are non-exclusive descriptions of possible embodiments of the present invention.

Apparatus and associated methods relate to a for sequentially opening and/or closing a plurality of switches. The system includes a rotatable disk having a plurality of indexing members attached thereto. The plurality of indexing members are evenly distributed along a circular path centered on an axis of rotation of the rotatable disk. The system includes a rotational securing assembly configured to sequentially secure and release the plurality of indexing members attached to a rotatable disk, thereby sequentially securing and releasing the rotatable disk to and from a sequence of rotational positions. The system includes a ratcheting assembly configured to sequentially engage a plurality of advancing members of the rotatable disk, thereby sequentially rotating the rotatable disk to a next one of the sequence of rotatable positions. The system includes a plurality of switches attached to an annular frame and distributed along a second circular path centered on the axis of rotation and axially aligned with a cam coupled to the rotatable disk. Each of the plurality of switches have a spring-loaded contact configured to either open or close the switch in response to a cam being rotatably aligned with the spring-loaded contact. The system includes a control system configured to coordinate operations of the rotational securing assembly with the ratcheting assembly so as to advance rotation of the rotatable disk in a stepwise fashion to a next one in the sequence of rotational positions. The control system causes: i) the rotational securing assembly releases a previously secured one of the plurality of indexing members of the rotatable disk; then ii) the ratcheting assembly engages a next one of the plurality of advancing members of the rotatable disk; then iii) the rotational securing member secures a next secured one of the plurality of indexing members; and iv) the steps i) through iii) are repeated, thereby sequentially opening or closing the plurality of normally-closed and/or normally open switches.

The system of the preceding paragraph can optionally include, additionally and/or alternatively, any one or more of the following features, configurations and/or additional components:

A further embodiment of the foregoing systems, wherein the advancing members and the indexing members can be one and the same.

A further embodiment of any of the foregoing system, wherein the plurality of switches can be distributed at the regular angular intervals along a second circular path centered on the axis of rotation.

A further embodiment of any of the foregoing systems, wherein each of the sequence of rotational positions of the rotatable disk can align the cam with a corresponding one of the plurality of switches.

A further embodiment of any of the foregoing systems, wherein the ratcheting assembly can include: i) a ratcheting pawl configured to engage and rotate an engagement-ready one of the plurality of indexing members when moving in a first direction and to bypass a next engagement-ready one of the plurality of indexing members when moving in a second direction; and/or ii) a reciprocating actuator that alternately moves the ratcheting pawl in the first and second directions, thereby performing cycles of actuation, in each of which the ratcheting pawl engages and rotates the engagement-ready one of the plurality of indexing members thereby rotating the rotatable disk to a next one of the plurality of angular positions.

A further embodiment of any of the foregoing systems, wherein the reciprocating actuator can be a rotary solenoid configured to alternately rotate a ratcheting pawl about the axis of rotation between first and second angular positions having an angular difference therebetween greater than the angular distance equal to regular angular intervals defined by the sequence of rotational positions.

A further embodiment of any of the foregoing systems, wherein the controller can include a plurality of switches configured to generate control signals indicative of rotational angles of the second rotatable shaft corresponding to projecting and retracting of each of the index-stop and the index hold members.

A further embodiment of any of the foregoing systems, wherein the rotational securing assembly can include: i) an index-stop member configured to move between a first position and a second position, the index-stop member configured to permit forward rotation of a last rotation-restricted one of the plurality of indexing members when in the first position and to block forward rotation of a next rotation-restricted one of the plurality of indexing members in the second position; and/or ii) an index-hold member configured to move between a first position and a second position, the index-hold member configured to block reverse rotation of a last rotation-restricted one of the plurality of indexing members in the first position and to permit forward rotation of a next rotation-restricted one of the plurality of indexing members when in the second position.

A further embodiment of any of the foregoing systems, wherein the controller can include: i) a first control switch configured to generate a first signal indicative of a first rotational position of the ratcheting pawl at which the index-stop and index-hold members move from the second positions to the first positions, thereby releasing the secured one of the plurality of indexing members; ii) a second control switch configured to generate a second signal indicative of a second rotational position of the ratcheting pawl at which the index-stop member moves from the first position to the second position, thereby blocking forward rotation of a next secured one of the plurality of indexing members; and/or iii) a third control switch configured to generate a third signal indicative of a third rotational position of the ratcheting pawl at which the index-hold member moves from the first position to the second position, thereby blocking reverse rotation of a next secured one of the plurality of indexing members.

A further embodiment of any of the foregoing systems, wherein the controller can include a Printed Circuit Board (PCB) coupled to the second rotatable shaft, the PCB having exposed radial traces that make electrical contact with a brush assembly, thereby generating the first second and third control signals.

Some embodiments relate to a method for sequentially opening or closing a plurality of switches. The method generally includes the steps of: i) releasing a rotatable disk; ii) rotating the rotatable disk a fraction of a rotation; iii) securing the rotatable disk in the advanced rotation; and then iv) repeating steps i) through iii). These general steps are performed more specifically as follows. A rotation-restricted one of a circular sequence of indexing members attached to a rotatable disk along a circular path centered on an axis of rotation is secured, thereby preventing rotation of the rotatable disk from a secured one of a sequence of rotational positions. A ratcheting pawl is retracted, thereby positioning the ratcheting pawl in a ready-to-advance-rotation position. The rotation-restricted one of the circular sequence of indexing members attached to the rotatable disk is released so that the rotatable disk can be freely rotated. The ratcheting pawl is advanced so as to engage one of a circular sequence of advancing members, thereby rotating the rotatable disk to a next one of the sequence of rotatable positions. An aligned one of a circular sequence of normally-closed and/or normally-open switches is opened or closed, respectively. The circular sequence of normally-closed and/or normally-open switches are attached to an annular frame and distributed along a second circular path centered on the axis of rotation. The above steps are repeated, thereby sequentially opening and/or closing the circular sequence of normally-closed and/or normally open switches.

The method of the preceding paragraph can optionally include, additionally and/or alternatively, any one or more of the following features, configurations and/or additional components:

A further embodiment of the foregoing method, wherein securing the rotation-restricted one of the circular sequence of indexing members attached to the rotatable disk can include: i) blocking, via an index-stop member, a forward path of the rotation-restricted one of the circular sequence of indexing members, thereby causing the rotational disk to stop rotating when the rotation-restricted one of the circular sequence of indexing members engages the index-stop member; and/or ii) blocking, via the index-hold member, a reverse path of the rotation-restricted one of the circular sequence of indexing members, thereby restricting reverse rotation of the rotational disk.

A further embodiment of any of the foregoing methods, wherein releasing the rotation-restricted one of the circular sequence of indexing members attached to the rotatable disk can include disengaging an index-stop member and an index hold member from the rotation-restricted one of a circular sequence of indexing members coupled to the rotatable disk, thereby permitting free rotation of the rotatable disk.

A further embodiment of any of the foregoing methods, wherein advancing the ratcheting pawl so as to engage one of a circular sequence of advancing members can include alternately moving, via a reciprocating actuator, the ratcheting pawl in the first and second directions, thereby performing cycles of actuation, in each of which the ratcheting pawl engages and rotates an engagement-ready one of the circular sequence of indexing members thereby rotating the rotatable disk to a next one of the plurality of angular positions.

A further embodiment of any of the foregoing methods, wherein the reciprocating actuator is a rotating solenoid, and wherein advancing a ratcheting pawl in a first direction can include rotating from a first angular position through a predetermined angle to a second angular position in a forward angular direction a rotatable shaft to which the ratcheting pawl is connected, wherein rotating the rotatable shaft is in response to forward operation of a rotary solenoid.

A further embodiment of any of the foregoing methods, can further include: synchronizing the index-stop member with the angular position of the ratcheting pawl; and/or ii) synchronizing the index-hold member with the angular position of the ratcheting pawl.

A further embodiment of any of the foregoing methods, wherein synchronizing the index-stop and index-hold members can include actuating a plurality of switches in response to rotational position of the ratcheting pawl.

A further embodiment of any of the foregoing methods, wherein disengaging an index-stop member and an index hold member from a last rotation-restricted one of a plurality of indexing members can be controlled by a first electrical switch activating in response to the rotational position of the ratcheting pawl being greater than a first predetermined rotational angle.

A further embodiment of any of the foregoing methods, wherein blocking, via the index-stop member, the forward path of the next rotation-restricted one of the plurality of indexing members can be controlled by a second electrical switch activating in response to the rotational position of the ratcheting pawl being greater than a second predetermined rotational angle.

A further embodiment of any of the foregoing methods, wherein blocking, via the index-hold member, the reverse path of the next rotation-restricted one of the plurality of indexing members can be controlled by a third electrical switch activating in response to the rotational position of the ratcheting pawl being greater than a third predetermined rotational angle.

It will be recognized that the invention is not limited to the implementations so described, but can be practiced with modification and alteration without departing from the scope of the appended claims. For example, the above implementations may include specific combination of features. However, the above implementations are not limited in this regard and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A method for sequentially opening and/or closing a sequence of switches, the method comprising the steps of:
    retracting a ratcheting pawl as one of a circular sequence of indexing members attached to a rotatable disk along a circular path centered on an axis of rotation is secured, thereby positioning the ratcheting pawl in a ready-to-advance-rotation position;
    releasing the one of the circular sequence of indexing members attached to the rotatable disk so that the rotatable disk can be freely rotated;
    advancing, as the one of the circular sequence of indexing members is released, the ratcheting pawl so as to engage an engagement-ready one of a circular sequence of advancing members attached to the rotatable disk, thereby rotating the rotatable disk to a next one of a sequence of rotational positions;
    blocking a path of the next one of the circular sequence of indexing members after the rotatable disk is rotated a fraction of a rotation;
    securing the next one of the circular sequence of indexing members after the next one of the circular sequence of indexing members engages an index-stop member; and
    securing the next one of the circular sequence of indexing members after the next one of the circular sequence of indexing members engages the index-stop member, thereby preventing rotation of the rotatable disk from a secured one of the sequence of rotational positions, wherein when the rotatable disk is secured in one of the sequence of rotational positions, an aligned one of a plurality of switches is opened or closed;

repeating the above steps, thereby sequentially opening and/or closing the the plurality of switches.

2. The method of claim 1, wherein securing the one of the circular sequence of indexing members attached to the rotatable disk comprises:
blocking, via the index-stop member, a forward path of the one of the circular sequence of indexing members after the rotatable disk is rotated the fraction of the rotation, thereby causing the rotational disk to stop rotating when the one of the circular sequence of indexing members engages the index-stop member; and
blocking, via an index-hold member, a reverse path of the one of the circular sequence of indexing members after the one of the circular sequence of indexing members engages the index-stop member, thereby restricting reverse rotation of the rotational disk.

3. The method of claim 2, wherein releasing the one of the circular sequence of indexing members attached to the rotatable disk comprises:
disengaging the index-stop member and the index-hold member from the one of the circular sequence of indexing members coupled to the rotatable disk, thereby permitting free rotation of the rotatable disk.

4. The method of claim 3, wherein advancing the ratcheting pawl so as to engage one of the circular sequence of advancing members comprises:
alternately moving, via a reciprocating actuator, the ratcheting pawl in the first and second directions, thereby performing cycles of actuation, in each of which the ratcheting pawl engages and rotates an engagement-ready one of the circular sequence of indexing members thereby rotating the rotatable disk to a next one of the plurality of angular positions.

5. The method of claim 4, wherein the reciprocating actuator is a rotary solenoid, and wherein advancing the ratcheting pawl in a first direction comprises:
rotating from a first angular position through a predetermined angle to a second angular position in a forward angular direction a rotatable shaft to which the ratcheting pawl is connected, wherein rotating the rotatable shaft is in response to a forward operation of the rotary solenoid.

6. The method of claim 5, further comprising:
synchronizing the index-stop member with the angular position of the ratcheting pawl; and
synchronizing the index-hold member with the angular position of the ratcheting pawl.

7. The method of claim 6, wherein synchronizing the index-stop and index-hold members comprises:
actuating the plurality of switches in response to a rotational position of the ratcheting pawl.

8. The method of claim 7, wherein disengaging the index-stop member and the index hold member from a last one of the plurality of indexing members is controlled by a first electrical switch of the plurality of switches activating in response to the rotational position of the ratcheting pawl being greater than a first predetermined rotational angle.

9. The method of claim 8, wherein blocking, via the index-stop member, the forward path of the next one of the plurality of indexing members is controlled by a second electrical switch of the plurality of switches activating in response to the rotational position of the ratcheting pawl being greater than a second predetermined rotational angle.

10. The method of claim 9, wherein blocking, via the index-hold member, the reverse path of the next one of the plurality of indexing members is controlled by a third electrical switch of the plurality of switches activating in response to the rotational position of the ratcheting pawl being greater than a third predetermined rotational angle.

11. A system for sequentially opening and/or closing a plurality of switches, the system comprising:
a rotatable disk having a plurality of indexing members attached thereto, the plurality of indexing members evenly distributed along a circular path centered on an axis of rotation of the rotatable disk;
a cam coupled to or part of the rotatable disk so as to rotate with the rotatable disk;
a rotational securing assembly attached to a fixed frame at a fixed rotational position about the axis of rotation and configured to sequentially secure and release the plurality of indexing members attached to the rotatable disk, thereby sequentially securing and releasing the rotatable disk to and from a sequence of rotational positions;
a ratcheting assembly having a ratcheting pawl configured to sequentially engage and move a plurality of advancing members attached to the rotatable disk, thereby sequentially rotating the rotatable disk to a next one of the sequence of rotational positions;
a plurality of switches attached to the fixed frame and distributed along a second circular path centered on the axis of rotation and axially aligned with the cam, each of the plurality of switches corresponding to one of the sequence of rotational positions and having a spring-loaded contact configured to either open or close the switch in response to the cam being rotationally aligned with the spring-loaded contact; and
a control system configured to coordinate operations of the rotational securing assembly with the ratcheting assembly so as to advance rotation of the rotatable disk in a stepwise fashion to the next one in the sequence of rotational positions, such that:
i) the ratcheting pawl is retracted as one of the circular sequence of indexing members is secured by the rotational securing assembly, thereby positioning the ratcheting pawl in a ready-to-advance-rotation position;
ii) the rotational securing assembly releases the one of the circular sequence of indexing members so that the rotatable disk can be freely rotated;
iii) as the one of the circular sequence of indexing members is released, the ratcheting pawl begins advancing so as to engage and move an engagement-ready one of the plurality of advancing members, thereby beginning rotation of the rotatable disk;
iv) the rotational securing assembly blocks the path of a next one of the circular sequence of indexing members after the rotatable disk is rotated a fraction of a rotation;
v) the rotational securing assembly secures the next one of the circular sequence of indexing members after the next one of the circular sequence of indexing members engages the index-stop member; and
vi) the steps i) through v) are repeated, thereby sequentially opening or closing the plurality of switches.

12. The system of claim 11, wherein the advancing members and the indexing members are one and the same.

13. The system of claim 11, wherein the plurality of switches is distributed at the regular angular intervals along a second circular path centered on the axis of rotation.

14. The system of claim 11, wherein each of the sequence of rotational positions of the rotatable disk aligns the cam with a corresponding one of the plurality of switches.

15. The system of claim 11, wherein
the ratcheting pawl is configured to engage and move an engagement-ready one of the plurality of advancing members when moving in a first direction and to bypass a next engagement-ready one of the plurality of advancing members when moving in a second direction, wherein the ratcheting assembly further comprises:
a reciprocating actuator that alternately moves the ratcheting pawl in the first and second directions, thereby performing cycles of actuation, in each of which the ratcheting pawl engages and rotates one of the plurality of indexing members thereby rotating the rotatable disk through the sequence of rotational positions.

16. The system of claim 15, wherein the reciprocating actuator comprises a rotary solenoid configured to alternately rotate the ratcheting pawl about the axis of rotation between first and second angular positions having an angular difference therebetween greater than the angular distance equal to regular angular intervals defined by the sequence of rotational positions.

17. The system of claim 16, wherein the controller comprises:
a plurality of switches configured to generate control signals indicative of rotational angles of the ratcheting pawl.

18. The system of claim 17, wherein the rotational securing assembly comprises:
an index-stop member configured to move between a first position and a second position, the index-stop member configured to permit forward rotation of the one of the plurality of indexing members when in the first position and to block forward rotation of the next one of the circular sequence of indexing members when in the second position; and
an index-hold member configured to move between a first position and a second position, the index-hold member configured to block reverse rotation of the one of the plurality of indexing members when in the first position and to permit forward rotation of the next one of the plurality of indexing members when in the second position.

19. The system of claim 18, wherein the controller comprises:
a first control switch configured to generate a first signal indicative of a first rotational position of the ratcheting pawl at which the index-stop and index-hold members move from the second position to the first position, thereby releasing the one of the plurality of indexing members;
a second control switch configured to generate a second signal indicative of a second rotational position of the ratcheting pawl at which the index-stop member moves from the first position to the second position, thereby blocking forward rotation of the next one of the plurality of indexing members; and
a third control switch configured to generate a third signal indicative of a third rotational position of the ratcheting pawl at which the index-hold member moves from the first position to the second position, thereby blocking reverse rotation of the next one of the plurality of indexing members.

20. The system of claim 19, wherein the controller comprises:
a Printed Circuit Board (PCB) coupled to the ratcheting pawl, the PCB having exposed radial traces that make electrical contact with a brush assembly, thereby generating the first, second, and third control signals.

* * * * *